United States Patent
Emmelmann

(12) 
(10) Patent No.: US 6,201,211 B1
(45) Date of Patent: Mar. 13, 2001

(54) APPARATUS FOR WELDING TOGETHER TWO COMPONENTS

(75) Inventor: Claus Emmelmann, Hamburg (DE)

(73) Assignee: Rofin-Sinar Laser GmbH, Hamburg (DE)

( * ) Notice: Subject to any disclaimer, the term of this patent is extended or adjusted under 35 U.S.C. 154(b) by 0 days.

(21) Appl. No.: 09/250,876

(22) Filed: Feb. 16, 1999

Related U.S. Application Data

(63) Continuation of application No. PCT/EP97/04298, filed on Aug. 7, 1997.

(30) Foreign Application Priority Data

Aug. 13, 1996 (DE) ................................. 196 32 625

(51) Int. Cl.$^7$ ................................................. B23K 26/06
(52) U.S. Cl. ............................... 219/121.63; 219/121.74; 219/121.76
(58) Field of Search .............. 219/121.63, 121.73, 219/121.74, 121.75, 121.76, 121.77, 121.78, 121.79, 121.8

(56) References Cited

U.S. PATENT DOCUMENTS

| | | | |
|---|---|---|---|
| 4,654,505 | * | 3/1987 | Sciaky et al. .................... 219/121.63 |
| 4,945,489 | * | 7/1990 | Vahab ........................... 219/121.63 X |
| 5,302,798 | * | 4/1994 | Inagawa et al. ............. 219/121.77 X |
| 5,616,261 | * | 4/1997 | Forrest ............................. 219/121.63 |
| 5,665,255 | * | 9/1997 | Busuttil ........................... 219/121.63 |

FOREIGN PATENT DOCUMENTS

| | | | |
|---|---|---|---|
| 4213424 | * | 10/1992 | (DE) ............................... 219/121.63 |
| 57-85687 | * | 5/1982 | (JP) . |
| 58-53384 | * | 3/1983 | (JP) . |
| 59-39490 | * | 3/1984 | (JP) . |
| 61-202788 | * | 9/1986 | (JP) . |

* cited by examiner

*Primary Examiner*—Samuel M. Heinrich
(74) *Attorney, Agent, or Firm*—Herbert L. Lerner; Laurence A. Greenberg; Werner H. Stemer

(57) ABSTRACT

A device for connecting two components by welding with a laser beam, in which the components are overlapping in a partial region of their mutually facing surfaces. The device includes an optical beam divider that has an inlet for the laser beam and a device for alternately distributing the laser beam to a plurality of outlets. Each of the outlets is optically coupled via a beam-guiding device to a laser welding head which contains a focusing and deflection lens system for guiding the focused laser beam over a surface of a component facing the laser welding head.

11 Claims, 3 Drawing Sheets

APPARATUS FOR WELDING TOGETHER TWO COMPONENTS

CROSS-REFERENCE TO RELATED APPLICATION

This is a continuation of copending International Application PCT/EP97/04298, filed Aug. 7, 1997, which designated the United States.

BACKGROUND OF THE INVENTION

Field of the Invention

The invention relates to an apparatus for welding together by a laser beam two components that overlap in a subregion of their mutually facing surfaces.

When welding components together, it is known to use not only so-called butt welds but also lap welds. Such lap welds, in which the components to be joined together overlap in a subregion of their mutually facing surfaces, are suitable in particular for the use of laser welding methods, since great welding depths with at the same time low heat input and an associated high welding quality can be achieved with a laser beam with high welding speeds. For production and commercial reasons, in the case of lap welds the components to be joined together are generally joined by a plurality of spaced-apart spot welds.

An apparatus for spot welding with a laser beam is known, for example, from European Patent 0 440 002 B1. In the case of the known apparatus, a laser welding head is disposed at the free end of a multi-jointed robot arm. With such a robot arm, the welding head can be guided freely over the surface of the component to be joined and stopped at the positions predetermined for spot welding. For this purpose, the welding head is positioned with the aid of the robot arm by a fixing element, by which the two components are pressed firmly against each other in an overlapping region. The fixing element includes two clasp-like clamping elements, one of which is provided with a central opening. The laser welding head is positioned and fixed over the central opening. This permits spot welding at a location of the overlapping region at which the components are pressed firmly against each other and as far as possible without any gaps therebetween. With the aid of the robot arm, the laser welding head can be brought successively up to a plurality of spaced-apart clamping elements, in order to ensure the strength of the joint by a multiplicity of such spot welds.

It is known from U.S. Pat. No. 4,654,505 to provide, instead of a single laser welding head which can be guided by a robot arm, a plurality of laser welding heads which are disposed on a clamping apparatus and into which the laser beam produced by a laser and spreading out freely is fed at successive times by adjustable mirrors.

However, the spot weld produced by the laser beam has a relatively small diameter, with the result that the required strength of the joint is ensured only by a correspondingly high number of spot welds. This entails increased expenditure with respect to process engineering, which calls into question the cost-effectiveness of spot-welding methods carried out with a laser beam.

German Patent 43 31 827 C1 discloses an apparatus for securing a screwed joint by a multiplicity of microwelded points produced by a laser beam and provided around the circumference of the screw head or the nut. In the case of this known apparatus, two or more part-beams are formed by a beam splitter disposed in the laser welding head, with the result that a plurality of microwelded points are produced simultaneously. An additional turning of the entire optical configuration within the laser welding head permits multiple setting of the microwelded points around the circumference of the screwed joint, by a single stationary laser welding head.

Japanese Laid-Open Application No. JP 58-68492 discloses an apparatus for spot welding by a laser beam, in which a rotatably mounted deflecting and focussing optical system is disposed in the laser welding head and is turned during the welding operation, with the result that the welded points form a circular line and the strength of the weld is increased.

SUMMARY OF THE INVENTION

It is accordingly an object of the invention to provide an apparatus for welding together two components that overcomes the above-mentioned disadvantages of the prior art devices of this general type, in which high cost-effectiveness and speed are accompanied by a welded joint having high strength.

With the foregoing and other objects in view there is provided, in accordance with the invention, an apparatus for welding together with a laser beam two components which overlap in a subregion of their mutually facing surfaces, including: a laser welding head; a beam-guiding device; an optical beam distributor having an input for receiving a laser beam, a plurality of outputs each coupled optically to the laser welding head via the beam-guiding device, and a distributor for alternately distributing the laser beam between the plurality of outputs; and a focussing and deflecting optical system disposed in the laser welding head receiving, guiding, and focussing the laser beam over a surface of a component facing the laser welding head.

The apparatus for welding together with a laser beam two components which overlap in a subregion of their mutually facing surfaces includes according to the invention an optical beam distributor. The optical beam distributor has an input for receiving the laser beam and a device for alternately distributing the laser beam between a plurality of outputs which are respectively coupled optically to a laser welding head via a beam-guiding device. In addition, there is a focussing and deflecting optical system disposed in the laser welding head for guiding and focussing the laser beam over the surface of the component facing the laser welding head.

By these measures, a linear weld can be produced without moving the laser welding head. That is to say even with the laser welding head disposed stationarily on the apparatus for receiving the parts to be joined, by guiding, i.e. moving, the laser beam over the surface of the component. In other words, instead of a number of spatially separated linear welds corresponding to the number of laser welding heads, the linear form is predetermined by the movement of the focussing and deflecting optical system in the laser welding head. As a result, the strength of the joint between the components is increased, without requiring an increase in the number of welds.

In an advantageous development of the invention, a focussing deflecting mirror is provided in the welding head for focussing the laser beam. As a result, the number of optical elements required in the welding head is reduced.

In particular, the focussing deflecting mirror is mounted in a linearly displaceable manner. As a result, a weld can be produced along a straight line.

In a further advantageous development of the invention, a lens is provided for focussing the laser beam. A plane-parallel plate which can be pivoted about an axis oriented perpendicularly with respect to the center axis of the laser beam is disposed in front of the lens in the direction of propagation of the laser beam. As a result, a weld can likewise be produced along a straight line.

In an advantageous development, a prism mounted rotatably about the center axis of the laser beam is disposed in front of the lens. In this way, a circular weld can be produced. This circular line, the diameter of whose circle can be chosen to be significantly greater than the line width, has the effect of simulating virtually a spot weld of large diameter, and similar strength values are achieved with improved welding quality.

A light-conducting fiber is preferably provided between the beam distributor and the laser welding head as a beam-guiding device. This permits a greater flexibility in the selection of the location of the laser welding heads, since the beam guidance is simplified in comparison with an apparatus in which the laser beam spreads out freely.

In the beam distributor in particular, pivotable or displaceable path-folding mirrors are disposed in the path of rays of the laser beam.

In a particularly preferred development, a path-folding mirror, which is rotatable about the axis of the laser beam falling onto it and to which a plurality of outputs are disposed in a stellar formation about this axis are assigned, is disposed in the path of rays of the laser beam in the beam distributor. As a result, the number of movable path-folding mirrors required for beam distribution is reduced.

Other features which are considered as characteristic for the invention are set forth in the appended claims.

Although the invention is illustrated and described herein as embodied in an apparatus for welding together two components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
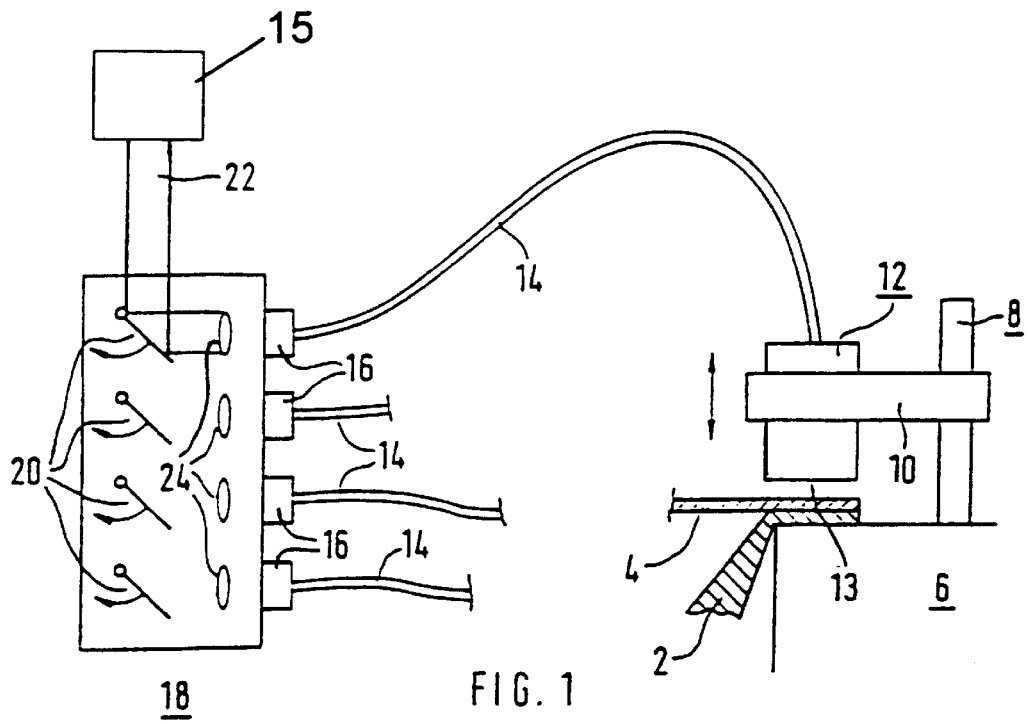
FIG. 1 is a diagrammatic illustration of a basic representation of an apparatus according to the invention.

In all the figures of the drawing, sub-features and integral parts that correspond to one another bear the same reference symbol in each case. Referring now to the figures of the drawing in detail and first, particularly, to FIG. 1 thereof, there is shown two components 2 and 4 to be joined together and disposed in a clamping device 6. The components 2 and 4 overlap in a subregion of their mutually facing surfaces and are braced against each other in the overlapping region by a multiplicity of clamping elements 8, of which only one is represented in the figure. In the exemplary embodiment, the clamping element 8 respectively includes a mounting 10, which can move, for example in a linear guide, and on which a laser welding head 12 is fixed. Instead of a linearly movable mounting, a pneumatically or hydraulically pivotable lever may also be provided.

The laser welding head 12 is pressed by its end face 13 in the overlapping region of the two components 2 and 4 against the surface of the component 4 facing it and makes the mutually facing surfaces of the components 2 and 4 bear against each other as far as possible without any gaps in a region in which a laser weld is to be carried out. The clamping element 8 consequently serves at the same time as a positioning device for positioning and fixing the laser welding head 12 over the surface of the component 4.

The laser welding head 12 is optically coupled via a beam-guiding device 14, in the exemplary embodiment a light-conducting fiber, to an output 16 of an optical beam distributor 18, each output 16 being assigned a laser welding head 12. The optical beam distributor 18 includes a number of pivotable path-folding mirrors 20 corresponding to the number of outputs 16. The path-folding mirrors 20 are disposed in series and by which a laser beam 22, which is produced by a laser 15 and in the exemplary embodiment is freely guided, can be successively distributed between the different outputs 16, according to the pivoting position of the path-folding mirrors 20. In the optical beam distributor 18, each output 16 is preceded by a focussing optical system 24, by which the laser beam 22 is fed into the beam-guiding device 14.

The laser welding head 12 serves in the exemplary embodiment at the same time as part of the clamping element 8, by which the clamping force is transferred to the overlapping components 2 and 4.

Figure 2:
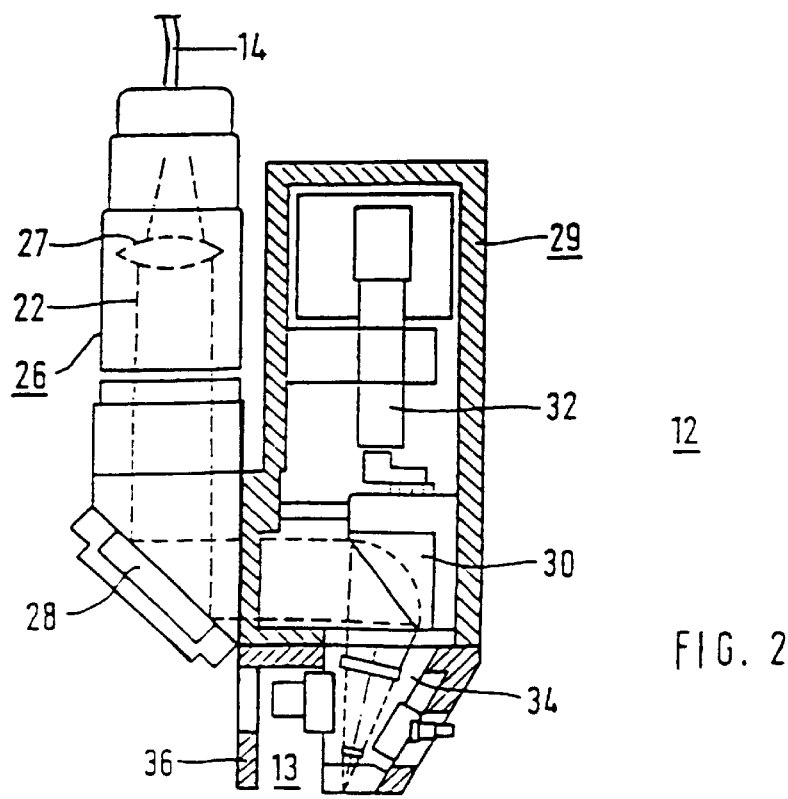
FIG. 2 is a longitudinal section view of a laser welding head of the apparatus.

According to FIG. 2, the laser welding head 12 includes a collimating unit 26 with a collimating optical system 27, which is depicted by dashed lines and in which the laser beam 22 emanating from the light-conducting fiber of the beam-guiding device 14 is collimated. Disposed at an output of the collimating unit 26 is a fixed deflecting mirror 28, by which the collimated laser beam is deflected by 90°. In addition to the collimating unit 26, there is disposed a focussing unit 29, which includes a focussing deflecting mirror 30, by which the laser beam 22 is focussed and deflected toward the end face 13. The focussing deflecting mirror 30 is disposed displaceably in the focussing unit 29, parallel to the direction of propagation of the collimated laser beam 22 falling onto it, with the result that it can be used to produce a linear weld. The length of the linear weld is limited by the maximum possible linear displacement of the focussing deflecting mirror 30. Drive elements 32 required for the linear displacement of the focussing deflecting mirror 30 are likewise disposed in the focussing unit 29. With the clamping device 6, which includes a plurality of such laser welding heads 12, the components 2 and 4 (FIG. 1) are joined together by a stitch weld.

The focussing unit 29 also includes a welding nozzle 34, such as is known, for example, from International Patent Application WO 95/03911. The welding nozzle 34 is disposed in a pressure-stable housing part 36 which is open at the bottom, can be placed onto the surface of the component 4 and transfers to the component 4 the clamping force exerted by the mounting 10 (FIG. 1) on the housing of the focussing unit 29 fixed in it.

Figure 3:
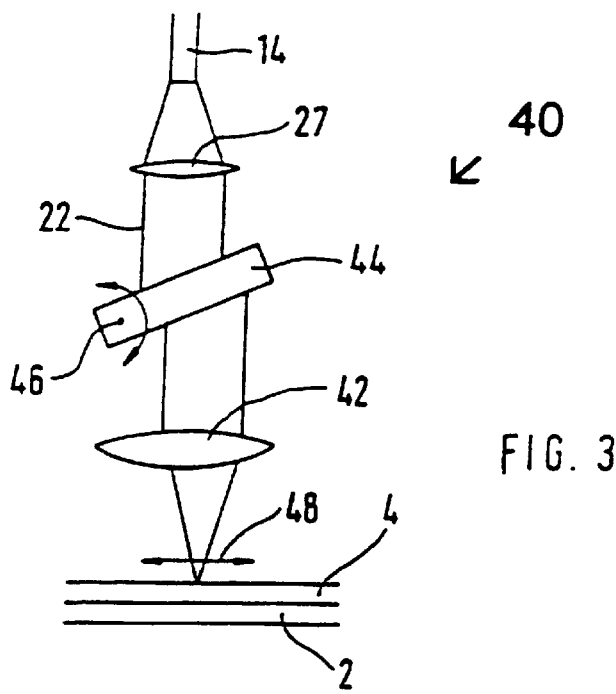
FIGS. 3 and 4 are illustrative representations of embodiments of a focussing and deflecting optical system disposed in the laser welding head.

In the exemplary embodiment according to FIG. 3, a laser welding head 40 is provided, in which a lens 42 is provided instead of the focussing deflecting mirror 30 provided in FIG. 2 for focussing the laser beam 22 collimated by the collimating optical system 27. Disposed in front of the lens 42 in the path of rays of the collimated laser beam 22, i.e. in the direction of propagation of the laser beam 22, is an optically transparent plane-parallel plate 44, which is mounted pivotably about an axis 46 oriented perpendicularly with respect to the center axis of the collimated laser beam 22. By pivoting the plane-parallel plate 42, the laser beam can be moved back and forth on the surface of the component 4 along a straight line 48.

Figure 4:
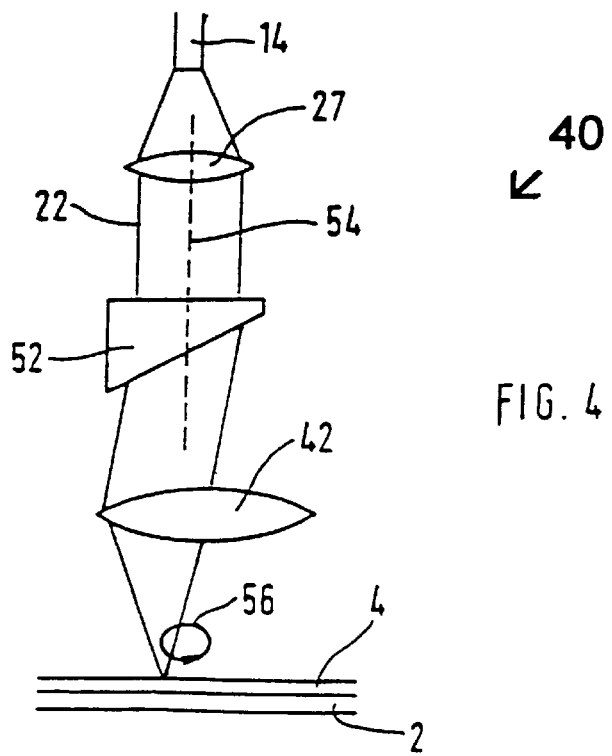

In the embodiment according to FIG. 4, a prism 52, which is transparent for the laser beam 22, is disposed in front of the lens 42 in the collimated laser beam 22, i.e. between the lens 42 and the collimating optical system 27. The prism 52 is mounted pivotably, preferably rotatably, about a center axis 54 of the laser beam 22. A rotation of the prism 52 through 360° has the effect that the focus of the laser beam 22 on the component 4 describes a closed curve 56, in the example a circle.

Figure 5:
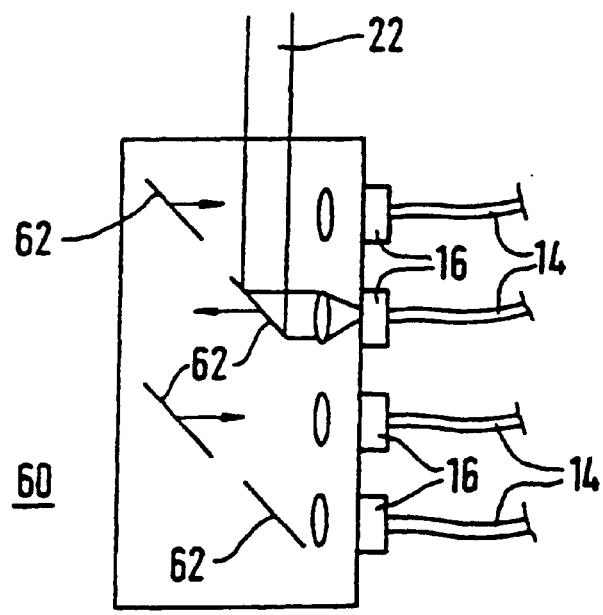
FIGS. 5 and 6 are illustrative representations of embodiments of a beam distributor, by which the laser beam of a laser can be distributed between a plurality of laser welding heads.

According to FIG. 5, a beam distributor 60 is provided, which, as a departure from the exemplary embodiment represented in FIG. 1, includes a multiplicity of linearly displaceable mirrors 62 disposed one behind the other.

Figure 6:
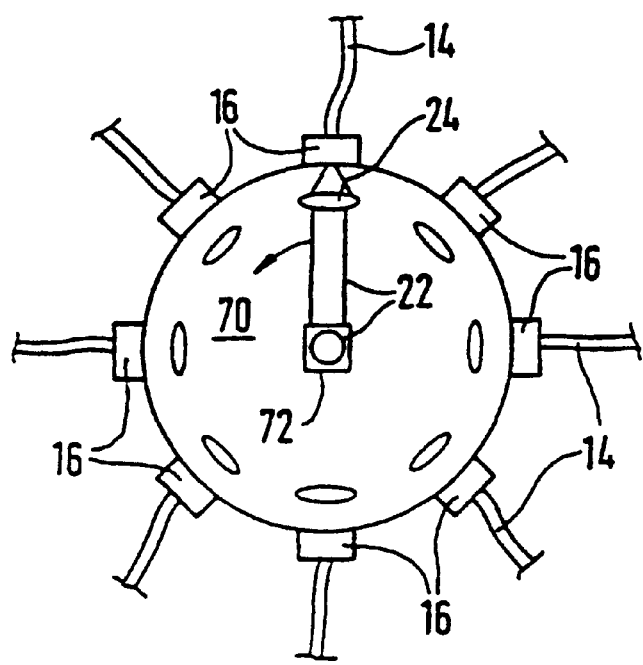

According to FIG. 6, in an advantageous development, a beam distributor 70 is provided, which includes a path-folding mirror 72 which is rotatable about the axis of the laser beam 22 falling onto it, is inclined at 450 with respect to this axis and with which the laser beam 22 can be distributed in a radial or stellar manner between outputs 16 disposed on the circumference of the beam distributor 70.

I claim:

1. An apparatus for welding together with a laser beam two components which overlap in a subregion of their mutually facing surfaces, comprising:
   a stationary laser source outputting a laser beam;
   a plurality of movable laser welding heads;
   a plurality of beam-guiding devices;
   an optical beam distributor having an input for receiving the laser beam, a plurality of outputs each coupled optically to a respective one of said plurality of laser welding heads via a respective one of said plurality of beam-guiding devices, and a distributor for alternately distributing the laser beam between said plurality of outputs; and
   a plurality of focussing optical systems and a plurality of deflecting optical systems, one of said focussing optical systems and one of said deflecting optical systems being disposed in a respective one of said plurality of laser welding heads receiving, guiding, and focussing the laser beam over a surface of a component facing a respective one of said laser welding heads,
   whereby at least one of said focussing optical systems and said deflecting optical systems is moveably disposed within a respective at least one of said laser welding heads for guiding the laser beam over the surface of the component when said respective at least one of said laser welding heads is in a fixed position.

2. The apparatus according to claim 1, wherein said one of said focussing optical systems and said one of said deflecting optical systems in a respective one of said laser welding heads define a focussing and deflecting system, and said focussing and deflecting system has a focussing deflecting mirror for focussing the laser beam.

3. The apparatus according to claim 1, wherein one of said focussing optical systems and said one of said deflecting optical systems in a respective one of said laser welding heads define a focussing and deflecting system, and said focussing and deflecting system has a linearly displaceably mounted deflecting mirror.

4. The apparatus according to claim 1, wherein one of said focussing optical systems and said one of said deflecting optical systems in a respective one of said laser welding heads define a focussing and deflecting system, and said focussing and deflecting system has a lens for focussing the laser beam.

5. The apparatus according to claim 4, wherein the laser beam has a center axis, and said focussing and deflecting system has a plane-parallel plate mounted pivotably about an axis oriented perpendicularly with respect to the center axis of the laser beam and disposed between said lens and a respective one of said beam-guiding devices.

6. The apparatus according to claim 4, wherein the laser beam has a center axis, and said focussing and deflecting system has a prism mounted rotatably about the center axis of the laser beam and disposed between said lens and a respective one of said beam-guiding devices.

7. The apparatus according to claim 1, wherein each of said beam-guiding devices is a light-conducting fiber disposed between said optical beam distributor and a respective one of said laser welding heads.

8. The apparatus according to claim 1, wherein said optical beam distributor has path-folding mirrors that can be pivoted in a path of the laser beam.

9. The apparatus according to claim 1, wherein said optical beam distributor has path-folding mirrors displaceable in a path of the laser beam.

10. The apparatus according to claim 1, wherein the laser beam has an axis, said optical beam distributor has a path-folding mirror receiving the laser beam and is rotatable about the axis of the laser beam, and said plurality of outputs of said optical beam distributor are radially disposed about the axis of the laser beam.

11. An apparatus for welding together two components which overlap in a subregion of their mutually facing surfaces, comprising:
   a stationary laser source outputting a laser beam;
   a plurality of moveable laser welding heads;
   a plurality of beam-guiding devices;
   an optical beam distributor having an input for receiving the laser beam, a plurality of outputs each coupled optically to a respective one of said plurality of laser welding heads via a respective one of said plurality of beam-guiding devices, and a distributor for alternately distributing the laser beam between said plurality of outputs; and
   a plurality of focussing optical systems and a plurality of deflecting optical systems, one of said focussing optical systems and one of said deflecting optical systems being disposed in a respective one of said plurality of laser welding heads receiving, guiding, and focussing the laser beam over a surface of a component facing a respective one of said laser welding heads,
   whereby at least one of said focussing optical systems and said deflecting optical systems is moveably disposed within a respective at least one of said laser welding heads for guiding the laser beam over the surface of the component when said respective at least one of said laser welding heads is in a fixed position.

* * * * *